United States Patent [19]
McNett

[11] Patent Number: 5,429,253
[45] Date of Patent: Jul. 4, 1995

[54] VEHICLE MOUNTED LIGHTWEIGHT PIVOTING HOIST

[76] Inventor: Donald L. McNett, c/o P.O. Box 427, Bay City, Tex. 77404

[21] Appl. No.: 604

[22] Filed: Jan. 5, 1993

[51] Int. Cl.6 ............................................... B60P 1/54
[52] U.S. Cl. .................... 212/253; 212/180; 212/225; 212/292; 414/543
[58] Field of Search ................. 414/543; 212/204, 225, 212/228, 229, 180, 244, 253, 254

[56] References Cited

U.S. PATENT DOCUMENTS

| | | | |
|---|---|---|---|
| 1,291,746 | 1/1919 | Bradney et al. | 212/253 |
| 2,636,619 | 4/1953 | Alexander | 212/204 |
| 2,772,795 | 12/1956 | Cramer et al. | 212/254 |
| 2,877,905 | 3/1959 | Wiley | 212/225 |
| 2,947,425 | 8/1960 | Nichols | 414/543 |
| 3,113,681 | 12/1963 | Crile | 212/228 |
| 3,358,849 | 12/1967 | Becker | 212/225 |
| 4,069,922 | 1/1978 | Hawkins | 414/543 |

FOREIGN PATENT DOCUMENTS 10184 of 1885 United Kingdom ................ 212/254

Primary Examiner—Michael S. Huppert
Assistant Examiner—Thomas J. Brahan
Attorney, Agent, or Firm—James L. Jackson

[57] ABSTRACT

A mounted, elevatable, lightweight pivotal boom is provided which defines an elongate internal track defining a downwardly facing slot. An electromechanical winch mechanism is provided for lifting and handling objects such as the windshield of an automotive vehicle and which includes roller supports having rollers that are received by the internal track of the boom. The winch mechanism includes a DC motor which is provided with a detachable control circuit to provide for its selective operation. The horizontal, pivotal boom is supported by fixed and movable telescoping standards and may be elevated manually or by means of a jack mechanism such as a manual or powered operable mechanical, hydraulic or electrical jack. The lightweight nature of the lift components enable the lift to be easily positioned by a single worker for optimum lifting and handling of lightweight loads.

12 Claims, 2 Drawing Sheets

VEHICLE MOUNTED LIGHTWEIGHT PIVOTING HOIST

FIELD OF THE INVENTION

This invention relates generally to lift devices for raising, lowering and lateral positioning of loads. More particularly, the present invention concerns a vehicle mounted lightweight pivotal electromechanical hoist mechanism having a vertically positionable pivotal boom defining an elongate track for hoist travel on the boom. This invention enables a single worker to easily handle light but awkwardly shaped objects. For example, a worker using the invention can easily remove a damaged windshield from an automotive vehicle and install a replacement windshield without requiring the worker to exert significant manual lifting and handling effort.

Though this invention is discussed herein particularly as it relates to automotive glass replacement, such use is not intended to limit the spirit and scope of this invention. The hoist mechanism may also be used for general lifting of lightweight objects and finds effective use in situations where objects, which can be manually lifted and handled, are more easily and efficiently handled by the apparatus of this invention.

BACKGROUND OF THE INVENTION

The multi-layered safety glass windshields for various types of automotive vehicles are subject to being struck by rocks and other debris as the automotive vehicle is used on roadways. In some cases, the windshield can be struck with sufficient force that the windshield can become cracked or otherwise damaged. In such case, it is often necessary to remove the damaged windshield such as by cutting away a portion of the elastomer seal that is typically provided in original equipment Windshield installation. After the windshield trim has been removed from its location about the windshield opening, typically the outer portion of the elastomer seal is cut away to expose the edges of the damaged windshield. Thereafter, the damaged windshield is forced outwardly typically by a worker who pushes against the inner surface of the windshield. A replacement windshield is then installed by locating it in supported relation with the seal and by using a bonding or cementing material to secure and seal the windshield. In some cases during windshield removal, a worker may apply force against the inner surface with the feet or by pushing against it with the worker's head. It is not unusual in the case of for windshield glass replacement workers that the neck vertebrae can become injured to the extent that nerves can become pinched as the result of pushing against a windshield with the head. In such cases, the worker must typically undergo certain medical or chiropractic therapy to ease the pain of such nerve damage.

Historically automotive windshield replacement has been accomplished inside a repair facility at which the owner of the vehicle presents the vehicle for service. These facilities generally have heavy duty lifts or hoists which are movable along I beams. Though these types of lifts are suitable for heavy duty truck installation, they are not suitable for lightweight vehicles such as standard and small pick-up trucks. In more recent years automotive windshield replacement is also being accomplished at the site of the automotive vehicle. In this case, the glass replacement personnel, typically carry replacement windshields in the bed of a small truck such as a pick-up truck. For replacement of automotive windshields on site, the worker will remove the damaged windshield in the manner described above. Thereafter, the worker will obtain a new windshield from the windshield stock typically supported in a protective rack retained within the bed of the service truck. The worker will then properly place the replacement windshield in assembly with the seal, utilizing bonding material or other suitable sealant in order to establish a positive, weather-tight seal between the new windshield and the remaining portion of the original seal.

Since the replacement windshield must be expertly placed, and since the worker can not climb onto the vehicle during replacement, it is typically required that the worker grasp the new windshield by one end and hold it outwardly and bring it into proper placement with the prepared seal. The manual lifting and awkward support that is needed to enable a worker to hold a windshield by its end and properly place it in assembly with the seal requires considerable manual dexterity, effort, and strength. The worker typically stands on the ground beside the vehicle for which the windshield is being replaced and holds the windshield horizontally, with the worker's arms typically outstretched. This is almost always a very awkward, unsatisfactory lifting position. For this reason it is well known that windshield replacement workers have a very high frequency of back injuries that result from handling heavy automotive windshields in this awkward lifting position. Consequently, the medical expenses associated with automotive windshield repair and replacement by on-site workers are quite high. It is becoming almost mandatory that, for on-site windshield replacements, there be provided a two-worker windshield replacement crew to thereby enable two workers, each holding respective ends of the windshield to remove it or to support and properly place it. Obviously, the requirement for a second worker for mobile on-site windshield replacement adds significantly to the labor requirement for the windshield replacement operation. It is desirable, therefore, to provide an effective windshield replacement system that will enable a single worker to perform on-site automotive windshield replacement without requiring that worker to exert significant manual lifting force for lifting, handling and placing windshields. It is also desirable to minimize the possibility of injury to on-site windshield replacement workers and to eliminate the additional labor that results when a two-worker windshield installation crew is employed for this purpose. It is also desirable to provide an automotive vehicle windshield replacement system that enables a single worker to easily and accurately achieve removal of a damaged windshield and installation of a replacement windshield without exerting significant manual lifting during the entire operation.

SUMMARY OF THE INVENTION

It is a principal feature of the present invention to provide a novel vehicle mounted lifting and handling mechanism that effectively enables a single worker to accomplish lifting and handling of lightweight objects such as windshield lifting and handling that occurs as a damaged windshield is removed from an automotive vehicle and a new windshield is installed in place thereof.

It is another feature of this invention to provide a novel vehicle mounted lightweight mechanized hoist having a pivotal horizontal boom and having a roller supported hoist that is movable along the length of the boom, being supported for movement by an internal track defined within the boom.

It is also a feature of this invention to provide a novel vehicle-mounted windshield lifting and handling mechanism incorporating a lightweight horizontal boom that is capable of being easily raised and lowered in relation to the windshield replacement vehicle so as to easily accommodate windshield replacement services for most automotive vehicles such as automobiles, vans and trucks of all sizes and yet permits the lifting mechanism to assume a low position for vehicle travel and for windshield lifting and handling when the site for windshield replacement has minimum overhead clearance.

It is another feature of this invention to provide a novel automotive vehicle lifting and handling mechanism having a horizontal boom defining an internal track with an electromechanical winch being freely movable along the track so as to permit the winch mechanism to assume a proper lifting position in relation to the automotive windshield being removed or installed.

Briefly, the various features of the present invention are accomplished through the provision of a novel lightweight lifting and handling mechanism having a base standard which is disposed in fixed relation with respect to a service vehicle such as a small truck and which may be mounted inside of the bed of the truck or to the front or rear bumper of the truck or to a side portion of the vehicle as may suit the needs of windshield replacement personnel, truck owners, etc. Within the base standard is telescopically received vertically a movable standard having a pivotal support at its upper extremity to which is assembled a horizontal boom. The movable standard enables the boom to be raised and lowered as is suitable for its efficient use. It may be raised or lowered through a manual operation because of its lightweight construction and it may be retained in a suitable elevated position by a manual locking mechanism if desired. In the alternative, the movable standard may be raised and lowered by means of a mechanical lift mechanism such as a simple rack and pinion type jack mechanism which is incorporated therein.

The horizontal boom defines an elongate internal track extending throughout most of its length and defines a downwardly facing elongate slot. One or more wheeled trolleys are movable along the length of the internal track of the boom and have hoist supports which extend through the elongate slot. An electric motor driven hoist or winch mechanism is connected to the supports of the trolleys and is thus movable lengthwise in relation to the boom along most of its length. The direct current (DC) electric motor of the electromechanical winch mechanism is typically driven by an electric circuit which is coupled with the storage battery of the service vehicle. The winch mechanism is controlled by manual operation of a control circuit which is removably attached to the winch mechanism thus enabling the control circuit to be removed so that it will not be subject to damage during vehicle travel or during exposure to weather conditions.

The pivot mechanism for the horizontal boom will enable 360° pivoting thereof, thus permitting a windshield replacement worker to place the boom at most any suitable position to enable the windshield replacement operation to be efficiently accomplished. This pivot mechanism is also provided with a locking device that enables the device to be locked at any suitable position that is desired by service personnel. Attachment of the winch lifting mechanism to the windshield being replaced or installed is accomplished by means of one or more suction cup lifting devices which establish a supporting relation with a windshield by means of mechanically induced suction.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings

FIG. 1 is an elevational view of a small truck such as a pick-up truck which incorporates a windshield lifting and handling mechanism that is constructed in accordance with the teachings of the present invention.

FIG. 2 is a partial elevational view of a portion of the preferred embodiment of this invention with the pivot portion thereof broken away and shown in section.

FIG. 3 is a bottom view of a portion of the windshield lifting and handling system of this invention, taken along line 3—3 of FIG. 2.

FIG. 4 is a sectional view taken along line 4—4 of FIG. 2.

FIG. 5 is a fragmentary sectional view of a pivotal electromechanical lift mechanism representing an alternative embodiment of the present invention.

FIG. 6 is a sectional view taken along line 6—6 of FIG. 5.

DETAILED DESCRIPTION OF PREFERRED EMBODIMENT

Figure 1:
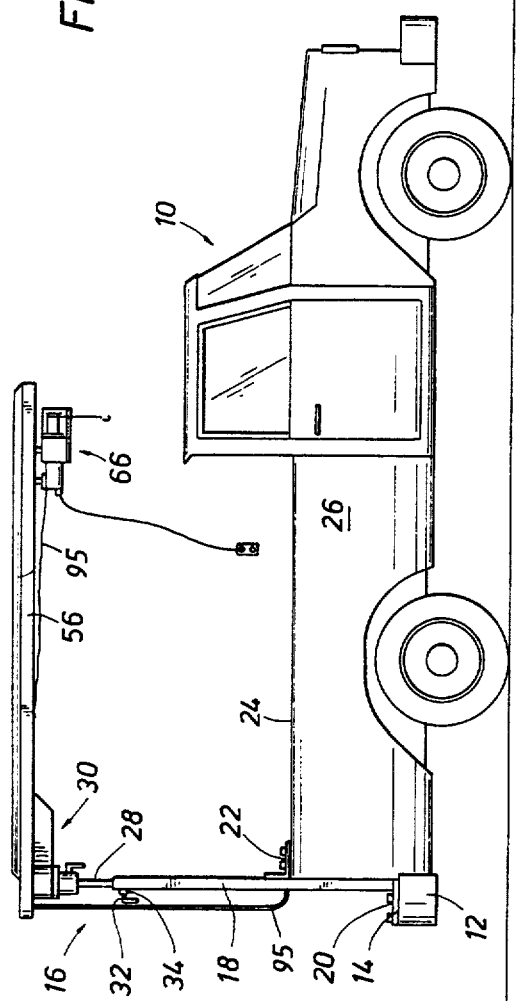

Referring now to the drawings and first to FIG. 1, a service vehicle such as a pick-up truck is shown generally at 10 which includes a rear bumper structure 12 having a flat upper surface 14 that projects laterally beyond the ends of the pivotal tailgate of the truck, thus enabling the tailgate of the truck to be pivotally opened and closed without in any way being interfered with by the windshield lifting and handling mechanism of this invention. Mounted on the rear bumper 12 of the truck is a windshield lifting and handling mechanism shown generally at 16 which is constructed in accordance with the present invention and which represents the preferred embodiment. The mechanism 16 incorporates a fixed standard 18 having a base plate 20 which is fixed by welding, bolting, or by any other suitable means of connection to the lower end of the fixed or base standard. Intermediate the upper and lower extremities of the base standard 18 is provided an intermediate stabilizing bracket 22 which is typically fixed by bolting to the upper edge surface 24 of the side wall 26 of the vehicle bed structure or to another portion of the service vehicle. The stabilizing bracket 22 may be connected by welding, bolting, or by any other suitable means of attachment to the intermediate portion of the base standard 18.

Although the base plate 20 is shown to be bolted or otherwise connected to the upper surface 14 of the bumper 12, this character of mounting is not to be taken as restricting the scope of this invention. In an alternative embodiment, for example, the base plate structure 20 or its equivalent may be suitably bolted to the bottom wall of the truck bed at a location which is near one corner thereof wherein the fixed base standard does not interfere with opening and closing of the tailgate. As a further alternative brackets may be employed to secure the base standard to the front bumper of the service vehicle or to the side of the vehicle, such as in the case of sedans or van-type service vehicles.

Figure 5:
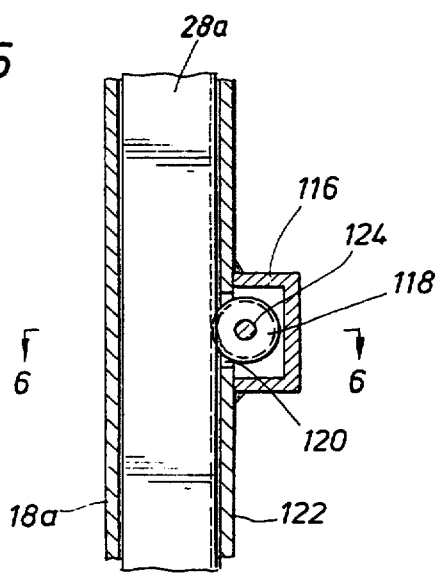
Figure 6:
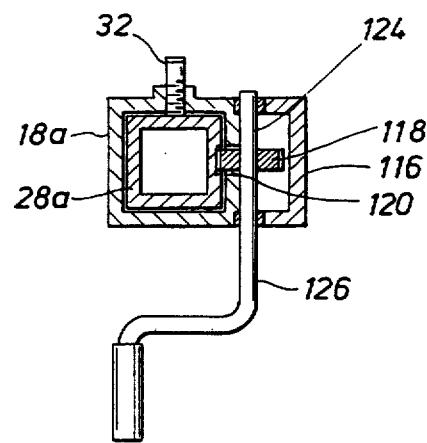

Within the base standard 18 is telescopically received a movable standard 28 having a pivot assembly shown generally at 30 fixed to the upper end thereof. Preferably, the movable standard 28 is disposed in non-rotatable rotation within the fixed base standard 18. One suitable means for accomplishing this feature is to manufacture the base standard 18 from a section of rectangular tubing and to manufacture the movable standard 28 from a length of rectangular bar or tubing such that the rectangular movable standard 28 establishes a non-rotatable but vertically movable relation with respect to the base standard 18. To promote the lightweight nature of the lifting mechanism both of the standards may be composed of lightweight metal tubing such as 16-gauge rectangular tubing. The length of the movable standard 28 is such relative to the fixed base standard 18 that the movable standard may be telescopically extended to a significant height while yet maintaining sufficient structural interconnection with the base standard that the fully telescopically extended standards will have significant load supporting structural integrity. The movable standard 28 may be locked in any suitable position relative to the base standard 18 such as by mean of a manual lock 32 which may be a threaded member which is received in driving engagement with a drive nut 34 that is fixed such as by welding to the upper portion of the base standard. The movable standard, together with the boom and winch mechanism is readily movable by lifting it manually. If desired, however, the movable standard 28 may be raised and lowered mechanically such as by means of a mechanized lift assembly such as rack and pinion jack mechanism which is shown in FIGS. 5 and 6 or by any other suitable means of controllably raising and lowering the movable standard relative to the base standard.

The apparatus is provided with a pivot assembly shown generally at 30, that includes a spindle 36 which is fixed to the upper end 38 of the movable standard 28. The spindle 36 extends through the central passage of a hub 40 and is received by an internal bearing assembly 42 of the hub. Thus, the hub is freely rotatable relative to the spindle 36 and to the movable standard 28. The bearing assembly 42 is retained in position relative to the spindle 36 by means of a retainer nut 44 and is sealed by a removable bearing cap 46.

Figure 3:
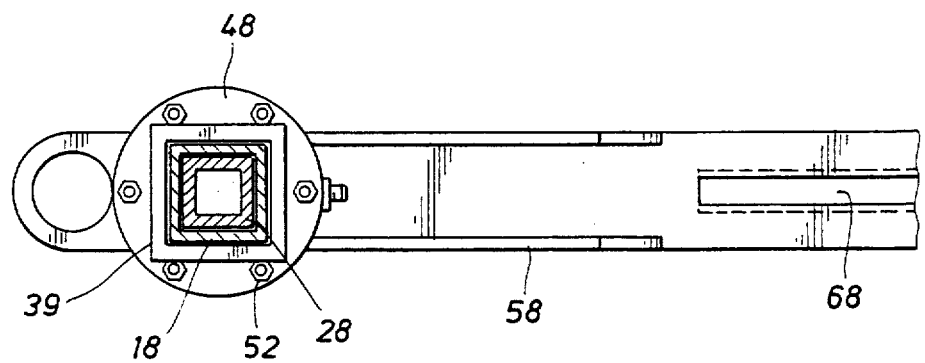
Figure 4:
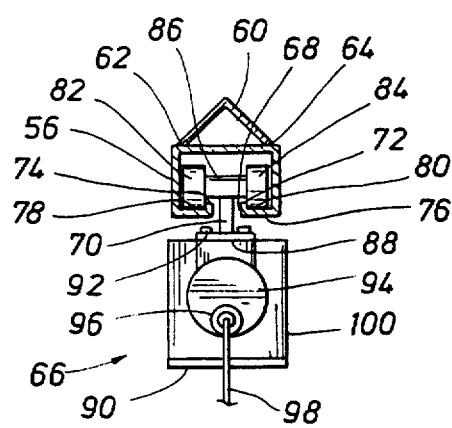

The hub 40 defines a circular support flange 48 having a plurality of stud openings through which threaded studs 50 extend. A skirt member 39 is connected to the lower portion of the hub and, when the movable standard is fully lowered, serves as a protective cover for the spindle and the upper portion of both standards. As shown in the bottom view of FIG. 3, the skirt 39 is of rectangular cross-sectional configuration although it may take other forms without departing from the spirit and scope of this invention. The skirt 39 is provided with a screw-type lock 41 which may be tightened on the spindle or on other structure to immobilize the pivot of the boom when such is desired. A plurality of retainer nuts 52 are utilized to secure the circular flange 48 to a generally cylindrical pivot housing structure 54 from which the threaded studs 50 project. The pivot or bearing housing 54 is welded or otherwise fixed to the lower surface portion of an elongate boom 56 thus permitting the boom to be pivotally supported by the hub structure and thus having free 360° pivot rotation about the movable standard 28. The horizontal boom 56 is preferably strengthened with respect to its connection with the cylindrical pivot housing 54 by means of a fillet member 58. The horizontal boom is preferably further strengthened from the standpoint of bending by means of a structural member 60 which is welded or otherwise fixed to the upper portion of the boom 56 as is evident from FIGS. 2 and 4. As shown in the cross-sectional illustration of FIG. 4, the structure member 60 may conveniently take the form of an elongate angle member which is welded along its sides to the upper corners of the elongate boom 56 as shown at 62 and 64.

It is desirable that the horizontal boom structure define an internal elongate track to enable a motorized winch, such as shown generally at 66, to have free linear movement along a significant portion of the length of the boom structure. This feature is effectively accomplished, as shown in a cross-sectional illustration of FIG. 4, by constructing the horizontal boom structure of generally rectangular stock such as formed 16-gauge sheet metal for example which defines a downwardly facing, elongate slot 68 through which one or more winch support devices 70 extend. The boom structure may also define a pair of internal upwardly projecting flanges 72 and 74 which, together with the bottom wall 76 of the rectangular boom structure, defines a pair of spaced, elongate tracks 78 and 80 which are engaged by roller wheels 82 and 84. The roller wheels provide rotatable support for a horizontal structural member 86 from which the winch support 70 depends. The winch support is provided with a bottom support plate 88 to which a motorized winch mechanism 90 is secured by means of bolts or other retainer devices 92.

Figure 2:
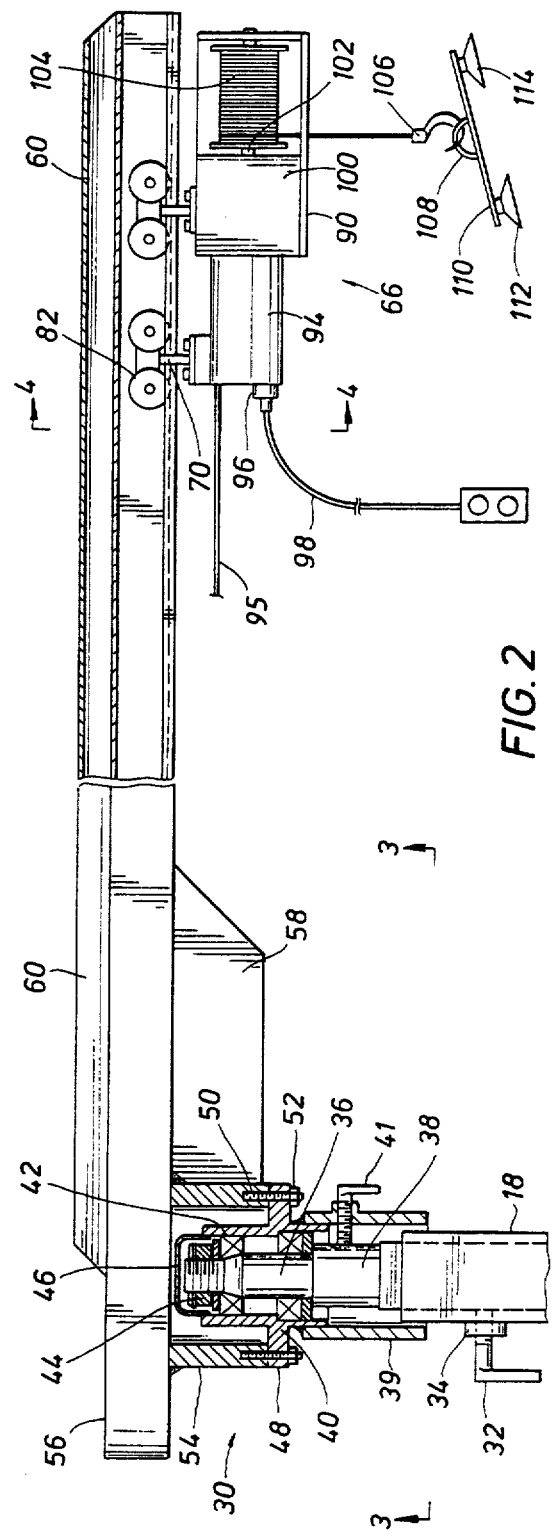

As shown at the right hand portion of FIG. 2, the motorized winch mechanism 66 is shown to depend from a pair of roller supports such as that described above in connection with FIG. 4. These roller supports permit the motorized winch mechanism to be freely movable along the length of the internal track defined by the boom structure. In this case, the motorized winch mechanism incorporates a DC electric motor 94 having its electrical supply circuit 95 disposed in connection with the electrical power circuit of the automotive vehicle 10. The motor 94 is provided with a quick disconnect fitting 96 permitting a motor control circuit 98 to be removably connected to the motor circuit. Thus, when the motorized winch mechanism is not being utilized the motor circuit 98 can be removed and properly stored so that it cannot be damaged during travel of the vehicle. This feature also enables the motor control circuitry to be protected from rain and other inclement weather conditions. The drive shaft of the DC electric motor 94 is coupled in driving relation with an internal transmission located within a transmission housing 100. From the transmission housing projects an output shaft 102 which provides for rotation and support of a rotatable winch spool 104 having a length of lifting cable wound thereabout. The free end of the cable may be provided with a lifting hook such as that shown at 106.

For the purpose of lifting and handling the glass windshield of an automotive vehicle, the hook structure 106 of the winch will be placed in connected relation with the lifting handle 108 of a suction type lifting device 110 having suction cups 112 and 114 thereon. The device 110 and its suction cups are of conventional nature and are manipulable to establish suction retention with the surface of a glass windshield. After this has been done, the control circuit 98 is appropriately manipulated to cause the motor driven winch mechanism to raise or lower the suction cup type lifting device and the windshield connected therewith. Being freely movable along the internal track the roller supported winch 66 will be moved by the force of lifting to a proper position for achieving the lift. To secure the roller supports in assembly with the track the front end of the boom can be secured by a closure plate, by a transversely located bolt or by any other suitable means. The suction cup lifting device can be placed centrally of the windshield so that when lifted, the windshield will be balanced and properly supported. The worker then will only need to pivot the boom which rotates freely about its spindle and move the motor supported winch linearly along the track of the boom to cause the windshield to be properly placed with respect to the service vehicle and/or the vehicle which is undergoing windshield replacement. Since the elongate boom 56 is capable of pivoting 360° relative to the movable standard 28, it is not a difficult task for the worker to position the service vehicle 10 such that efficient windshield replacement can be accomplished. Additionally, by manipulating the lock member 41 the boom can be locked in any selected position. Because the rollers of the motorized winch supports are freely movable along the length of the boom, the worker can very easily position the boom and motorized winch such that proper windshield handling may take place. The worker is not required to perform any lifting capability. The worker can readily achieve accurate placement of the windshield utilizing the motorized winch for raising and lowering thereof relative to the vehicle undergoing service. Other objects within the weight handling capability of the lift mechanism may be lifted and placed with ease.

As explained above, the movable standard 38 is capable of being raised and lowered with respect to the base standard 18 simply by releasing the standard locking device 32 and by manually moving the boom and standard upwardly. After the proper elevation of the movable standard 28 has been established, the locking device 32 will simply be rotated to again lock the movable standard 38 in releasable fixed relation with respect to the base standard.

Although the boom is easily raised and lowered by means of a manual operation, in the event more mechanized elevational control of the movable standard is desired, such can be accomplished simply by providing any suitable mechanical or hydraulic lift device such as a rack and pinion type gear drive mechanism as shown in FIGS. 5 and 6. In this case a drive housing 116 is welded or otherwise fixed to the base standard such as shown at 18a and provides rotatable support for a pinion gear 118 which projects through a gear access opening 120 in the base standard. The pinion gear is disposed with its drive teeth in driving engagement with the teeth of an elongate, vertically oriented rack gear 122 which is integral with or supported by the movable standard 28a. The pinion gear is supported in non-rotatable rotation by a gear drive shaft 124 which is defined by a crank 126. By rotating the crank 126 the pinion gear 118 induces vertical movement to the rack gear 122 and to the movable standard 28a to which it is attached or integrally machined. If desired, instead of the simple rack and pinion drive mechanism, the gear drive mechanism may have a more complex gear train if appropriate to the needs of the use. A worm gear drive mechanism may also be employed if desired. Thus, depending upon the needs of the user, the boom may be elevated manually as is evident from FIGS. 1 and 2 or may be elevated mechanically in the manner shown in FIGS. 5 and 6 or by any suitable power energized mechanism.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. A vehicle mounted lifting and handling mechanism, comprising:
 (a) a base standard being mounted in upright position on a service vehicle;
 (b) a movable standard being received in telescoping non-rotatable relation within said base standard and being selectively elevatable relative to said base standard;
 (c) a pivot assembly being provided at the upper end of said movable standard; and having:
  (1) a pivot hub defining an axis of rotation and having a bearing receptacle, said pivot hub further having a circular flange disposed in a normal relation with said axis of rotation;
  (2) a spindle extending from said upper end of said movable standard and being located within said pivot hub;
  (3) a bearing assembly being located within said pivot hub and establishing a rotatable supported relation between said spindle and said pivot hub;
  (4) a pivot housing depending from one end portion of said elongate boom and receiving a portion of said pivot hub, said pivot housing being connected to said circular flange;
  (5) a skirt member being fixed to said pivot hub and in the lowermost position of said movable standard relative to said base standard having a downwardly extending portion thereof positioned about said spindle and about the upper extremity of said base standard said skirt member being of non-circular configuration and being positionable in radially spaced relation about said upper extremity of said base standard at said lowermost position of said movable standard; and (6) a locking element being connected to said skirt member and being selectively positionable for locking said pivot assembly in immovable relation with said movable standard.

(d) an elongate boom being supported in generally horizontally oriented and pivotal relation by said pivot assembly, said elongate boom defining an internal track and a downwardly facing elongate slot extending along a major portion of the length thereof;

(e) a roller mounted support mechanism being located within said elongate boom and having roller wheels for support thereof by said internal track, said support mechanism having support elements extending downwardly through said elongate slot; and (f) an electromechanical winch being supported by said support elements and having an electric motor driven cable winch adapted for lifting.

2. The vehicle mounted lifting and handling mechanism of claim 1, wherein;

(a) said base standard is of non-circular cross-sectional configuration; and (b) said movable standard is of a cross-sectional configuration establishing a non-rotatable relation with said base standard.

3. The vehicle mounted lifting and handling mechanism of claim 1, wherein:

(a) a bottom mounting bracket is provided at the lower end of said base standard, said mounting bracket being receivable in structurally interconnected relation with the rear bumper of said truck and supporting said lower end of said base standard in fixed relation with said rear bumper; and (b) an intermediate mounting bracket being provided at an intermediate portion of said base standard and adapted for connection in fixed relation with an upper portion of the bed of said truck.

4. The vehicle mounted lifting and handling mechanism of claim 1, including:

(a) a bottom mounting bracket being provided at the lower end of said base standard and being adapted for connection in fixed relation to the bottom wall of the bed of said truck; and (b) an intermediate mounting bracket being provided intermediate the extremities of said base standard and adapted for connection in standard supporting relation with an upper portion of the bed of said truck.

5. The vehicle mounted lifting and handling mechanism of claim 1, including:

a locking mechanism being movably supported by said base standard and being manually operable to lock said movable standard at any desired position relative to said base standard.

6. The vehicle mounted lifting and handling mechanism of claim 5, wherein said jack mechanism comprises:

(a) an elongate rack gear being provided on said movable standard;

(b) a gear drive mechanism being supported by said base standard and having gear driving engagement with said elongate rack gear; and (c) means for selectively operating said gear drive mechanism.

7. The vehicle mounted lifting and handling mechanism of claim 1, including:

a jack mechanism being interconnected with said base standard and said movable standard and being selectively operable for raising and lowering said movable standard relative to said base standard.

8. A vehicle mounted lifting and handling mechanism, comprising:

(a) an elongate base standard of non-circular cross-sectional configuration;

(b) a bottom mounting bracket being provided at the lower end of said base standard and being adapted for connection in fixed relation to a lower portion of said vehicle;

(c) an intermediate mounting bracket being provided intermediate the extremities of said base standard and adapted for connection in standard supporting relation with an upper portion of said vehicle and cooperating with said bottom bracket for mounting said base standard in upright position on said vehicle;

(d) a movable standard having a non-circular cross-sectional configuration corresponding to that of said base standard being received in telescoping non-rotatable relation within said base standard;

(e) a pivot assembly being provided at the upper end of said movable standard and comprising:

(1) a pivot hub defining an axis of rotation and having a bearing receptacle, said pivot hub further having a circular flange disposed in normal relation with said axis of rotation;

(2) a spindle extending from said upper end of said movable standard and being located within said pivot hub;

(3) a bearing assembly being located within said pivot hub and establishing a rotatable supported relation between said spindle and said pivot hub;

(4) a pivot housing depending from one end portion of said elongate boom and receiving a portion of said pivot hub, said pivot housing being connected to said circular flange;

(5) a skirt member being fixed to said pivot hub and in the lowermost position of said movable standard relative to said base standard having a downwardly extending portion thereof positioned about said spindle and about the upper extremity of said base standard said skirt member being of non-circular configuration and being positionable in radially spaced relation about said upper extremity of said base standard at said lowermost position of said movable standard; and (6) a locking element being connected to said skirt member and being selectively positionable for locking said skirt member and thus said pivot assembly in immovable relation with said movable standard;

(f) an elongate boom being supported in generally horizontally oriented and free swinging pivotal relation by said pivot assembly, said elongate boom being of generally rectangular cross-sectional configuration and defining an elongate internal track and a downwardly facing elongate slot extending along a major portion of the length thereof;

(g) a roller mounted support mechanism being located within said elongate boom and having roller wheels for support thereof by said elongate internal track, said support mechanism having at least one support element extending downwardly through said elongate slot; and (h) an electromechanical winch being supported by said support element and having an electric motor driven cable winch adapted for lifting objects.

9. The vehicle mounted lifting and handling mechanism of claim 8:

(a) said bottom mounting bracket is receivable in structurally interconnected relation with the bumper of said vehicle and supporting said lower end of said base standard in fixed relation with said bumper; and (b) said intermediate mounting bracket being provided at an intermediate portion of said base standard and adapted for connection in fixed relation with a portion of said vehicle located above said rear bumper.

10. The vehicle mounted lifting and handling mechanism of claim 8, including:

a locking mechanism being movably supported by said base standard and being manually operable to lock said movable standard at any desired position relative to said base standard.

11. The vehicle mounted lifting and handling mechanism of claim 8, including:

a jack mechanism being interconnected with said base standard and said movable standard and being selectively operable for raising and lowering said movable standard relative to said base standard.

12. The vehicle mounted lifting and handling mechanism of claim 11, wherein said jack mechanism comprises:

(a) an elongate rack gear being provided on said movable standard; and (b) a gear drive mechanism being supported by said base standard and having gear driving engagement with said elongate rack gear.

* * * * *